US008779336B2

(12) United States Patent
Hung

(10) Patent No.: US 8,779,336 B2
(45) Date of Patent: Jul. 15, 2014

(54) RING TYPE INFRARED HEATING DEVICE

(76) Inventor: Hung-Wei Hung, New Taipei (TW)

( * ) Notice: Subject to any disclaimer, the term of this patent is extended or adjusted under 35 U.S.C. 154(b) by 9 days.

(21) Appl. No.: 13/584,903

(22) Filed: Aug. 14, 2012

(65) Prior Publication Data

US 2014/0048526 A1 Feb. 20, 2014

(51) Int. Cl.

| | |
|---|---|
| ***F28F 5/02*** | (2006.01) |
| ***B31F 1/28*** | (2006.01) |
| ***B32B 37/06*** | (2006.01) |

(52) U.S. Cl.
USPC ................ 219/470; 392/417; 34/110; 492/46

(58) Field of Classification Search
None
See application file for complete search history.

(56) References Cited

U.S. PATENT DOCUMENTS

| | | | | |
|---|---|---|---|---|
| 4,632,855 | A * | 12/1986 | Conlon et al. | 428/36.8 |
| 2002/0118984 | A1* | 8/2002 | Lee et al. | 399/330 |

* cited by examiner

*Primary Examiner* — Joseph M Pelham
(74) *Attorney, Agent, or Firm* — Bacon & Thomas, PLLC

(57) ABSTRACT

A ring type infrared heating device is used in manufacturing process for corrugated cardboard so that the paper surface passing through the heating device can be heated up to appropriate temperature for subsequent shaping operation. The ring type infrared heating device is mainly formed by a lengthwise drum and a plurality of ring type infrared lamps arranged within the lengthwise drum. The surface of the lengthwise drum can be heated quickly up to working temperature by the light radiation energy generated from the ring type infrared lamps, so as to facilitate the shaping operation of corrugated cardboard.

8 Claims, 5 Drawing Sheets

RING TYPE INFRARED HEATING DEVICE

BACKGROUND OF THE INVENTION

1. Field of Invention

The present invention relates to a ring type infrared heating device used in manufacturing process for corrugated cardboard, more particularly to a ring type infrared heating device using ring type infrared lamps as heating source for accelerating the preheating process and for easy control, easy maintenance purpose.

2. Related Art

Accompanying with increasing demand of goods packaging and transportation, demand for packaging material will be also increased. Typical packaging materials are plastic materials, as they are easy in manufacturing and convenient in acquiring raw materials. However, the reserve of raw materials has been decreased day after days and the price has been gradually increased, in addition environment pollution caused by massive usage of plastic materials has been becoming more and more serious. Therefore, it has been a common consensus in industries and consumers to switch into environmentally friendly and recyclable packaging materials.

As corrugated cardboard has environmentally friendly, recyclable properties and as it can be designed according to the shape of various objects to meet demand, the corrugated cardboard is widely used as packaging material for conventional various objects. Corrugated cardboard with stronger structural strength even can replace conventional wood material so as to enlarge its application range.

As the structural strength of the corrugated cardboard is enhanced by heat shaping, preheating should be firstly conducted for each paper raw material during shaping operation so as to facilitate the shaping operation. Referring to FIG. 1, the manufacturing apparatus 10 as shown in the figure mainly comprises a plurality of heating devices 101 which are connected separately to a bottom linerboard conveying device 102, a core-layer conveying device 103 and a surface-layer conveying device 104. Each of the heating devices 101 is communicated to a common furnace 11 in which steam generated therein is used as the heat source for each of the heating devices 101, so as to conduct heating treatment to the paper raw materials disposed on each of the heating devices 101. Next, forming, shaping, and conveying operations are further conducted separately on the paper raw materials after heating treatment by the bottom linerboard conveying device 102, the core-layer conveying device 103 and the surface-layer conveying device 104, and finally a corrugated cardboard is thus formed.

Referring to FIG. 2, the heating device 101 is a hollow tubular shape and the conventional furnace 11 using kerosene or gas as fuel generates steam after burning. The furnace 11 is connected to the heating device 101 in such a manner that the steam generated by the furnace 11 can be transferred to the interior of the heating device 101. In this manner, the surface of the heating device 101 can be heated up for subsequent operations by steam serving as the heating source. As the furnace 11 is a large-scale facility which needs a large space for set-up, and accordingly the set-up cost of the furnace 11 is high. Additionally, burning kerosene or gas increases not only the operating cost but also the misgiving of safety. Furthermore, as the heating device 101 has to accommodate the steam provided by the furnace 11, the heating device 11 itself must has a thickness enough to withstand the pressure produced by steam. It is easy to cause hazardous condition if the pressure is improperly controlled. Therefore, the heating device 101 is often made by thick and heavy material such as steel; this will lead to such disadvantages of the conventional heating device as high overall manufacturing cost, complicated structure, bulky overall volume, difficulty in temperature control, so as not to be conducive in assembly, replacement, and maintenance operations.

Referring to FIG. 3, the heating device 101 is tubular in shape with a big-area heating zone ‘a’ formed on its surface. After the interior of the heating device 101 is filled with steam, its surface can gradually reach working temperature so that the paper raw materials, after passing through the heating device 101, can be heated up to a temperature conducive to its shaping operation that is subsequent to the forming operation. In practical making of corrugated cardboard, the width of the paper raw material is often subjected to change according to specific demand of finished product. Taking this figure as an example, the width of the paper raw material 12 is far smaller than that of the heating zone ‘a’ and is approximately equal to that of the heating zone ‘a2’. This will result in idle state of the rest heating zones (a1, a3), that is to say, this indirectly lead to waste of energy.

In view of the abovementioned disadvantages, how to provide a corrugated cardboard manufacturing apparatus with light-weight, small volume, high safety, energy-saving, easiness in maintenance, labor hour and cost saving is a crucial issue in the relevant industries.

SUMMARY OF THE INVENTION

In view of the above problems, the inventor analyzes and researches current design of corrugated cardboard manufacturing device thereof based on the experience in the field of the corrugated cardboard for many years, and expects to improve the heating device for corrugated cardboard; Thus, the main object of the present invention is to provide a ring type infrared heating device, which has the features of compact dimensions, high safety, energy-saving, low set-up cost and easy maintenance.

In order to achieve above object, the ring type infrared heating device of the present invention mainly comprises a lengthwise drum, a lengthwise frame body and a plurality of ring type infrared lamps, wherein the lengthwise drum is hollow in its interior and is installed within the corrugated cardboard manufacturing apparatus to provide preheating treatment for the paper materials passing through it, so as to facilitate the shaping operation that is subsequent to its forming operation. The lengthwise frame body is formed by the assembly of a plurality of rigid skeletons, and the frame body is assembled at the inside of the lengthwise drum. The ring type infrared lamps are assembled sequentially at the outer edge of the lengthwise frame body. After each of the ring type infrared lamps is activated, heat can be produced quickly so that the surface of the lengthwise frame body is heated up to reach required working temperature promptly. In this way, during the manufacturing process of the corrugated cardboard by the present invention, equipment cost and set-up space can be remarkably reduced as there is no need of large-scale furnace facility. Moreover, as the present invention needs no fuel or steam as the heat source, not only energy consumption can be reduced but also the overall safety of use can be raised. In addition, the present invention can be used in a rotatable drum without wiring restriction, and maintenance can be carried out by only pulling the lengthwise frame body out of the lengthwise drum. Therefore, maintenance time and space cost can be saved effectively.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objects, the technical contents and the expected effect of the present invention will become more apparent from the detailed description of the preferred embodiment in conjunction with the accompanying drawings.

Figure 1:
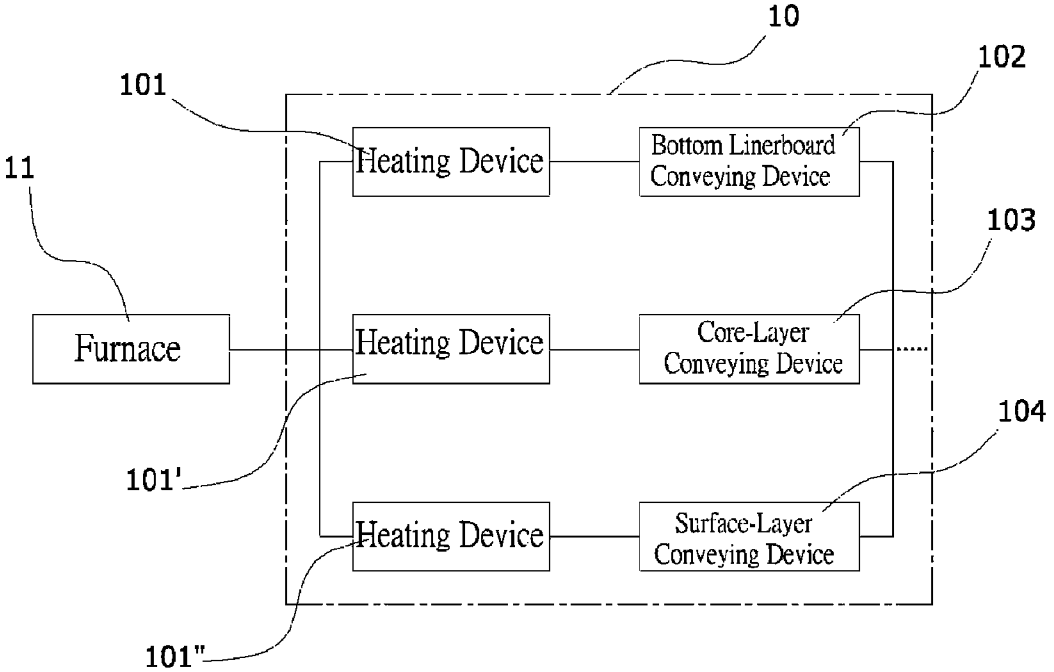
FIG. 1 is a schematic view showing a conventional manufacturing apparatus for corrugated cardboard.
Figure 2:
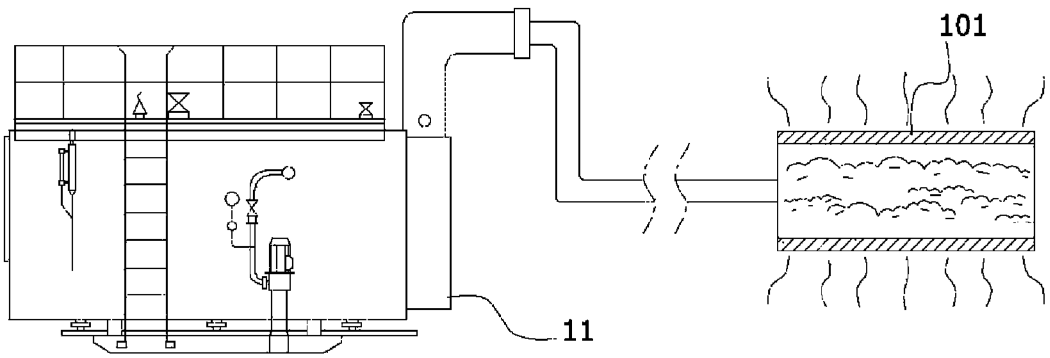
FIG. 2 is a schematic view showing the composition and operation of a furnace.
Figure 3:
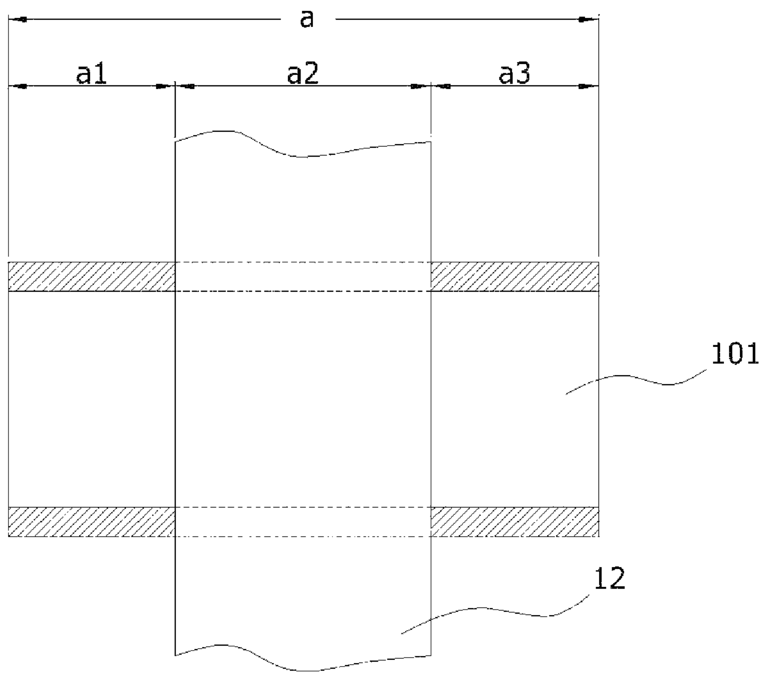
FIG. 3 is a schematic view showing the actuation of a conventional heating device.
Figure 4:
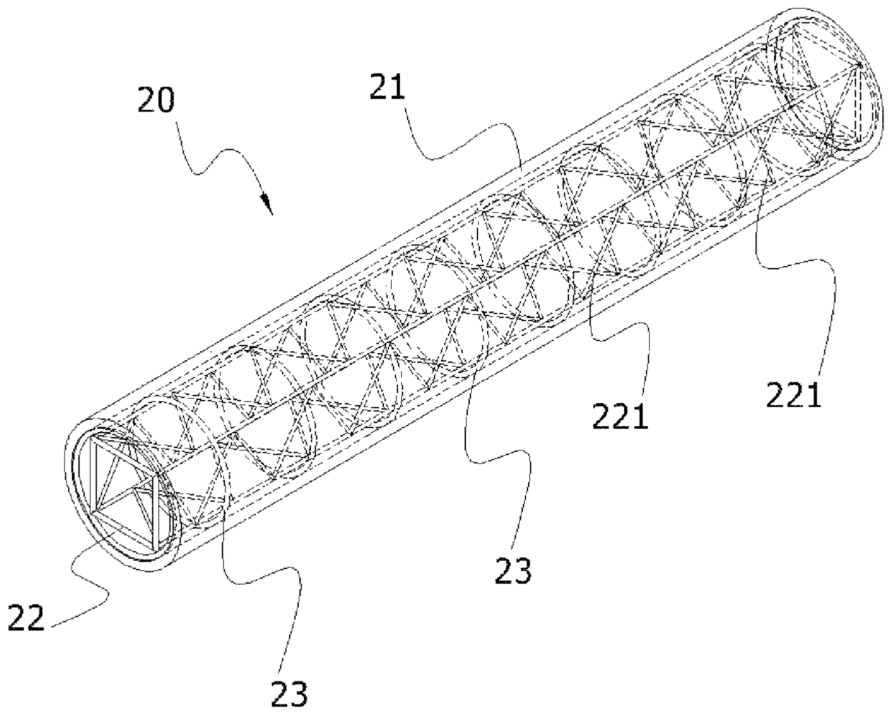
FIG. 4 is a schematic view showing the parts formation of the present invention.

Referring to FIG. 4, the ring type infrared heating device 20 of the present invention is assembled in a corrugated cardboard manufacturing apparatus. Alternatively, several ring type infrared heating devices 20 can be provided according to total requirement of apparatus. The ring type infrared heating device 20 can be in fixed state or in scrolling state. As shown in the FIG. 5, the ring type infrared heating device 20 is formed by a lengthwise drum 21, a lengthwise frame body 22 and a plurality of ring type infrared lamps 23. The lengthwise drum 21 is mounted within the corrugated cardboard manufacturing apparatus to provide preheating treatment for the paper materials passing through it, so as to facilitate the shaping operation that is subsequent to its forming operation.

The lengthwise drum 21 is hollow in its interior and the profile of its section can be designed as, for example, circular, semi-circular, and its surface can be designed as a curved or waved surface shape. The lengthwise frame body 22, formed by a plurality of rigid skeletons 221, is assembled within the lengthwise drum 21. The ring type infrared lamps 23 are arranged and disposed along the outer edge of the lengthwise frame body 22, and the ring type infrared lamps 23 are accommodated within the lengthwise drum 21, with positions located between the lengthwise drum 21 and the lengthwise frame body 22. The ring type infrared lamps 23 are mutually spaced at a predetermined interval. After activation, each of the ring type infrared lamps 23 can reach high temperature promptly and both the light and the heat energy thus produced can be transferred quickly in radiation manner to the surface of the lengthwise drum 21 so as to reach working temperature promptly.

Figure 6:
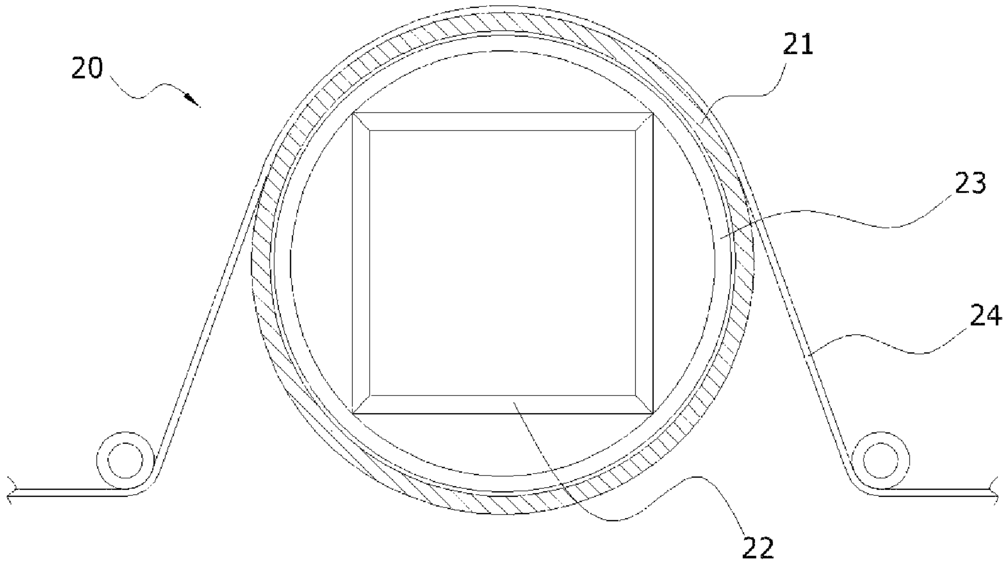
FIG. 6 is a sectional schematic view of the present invention.
Figure 7:
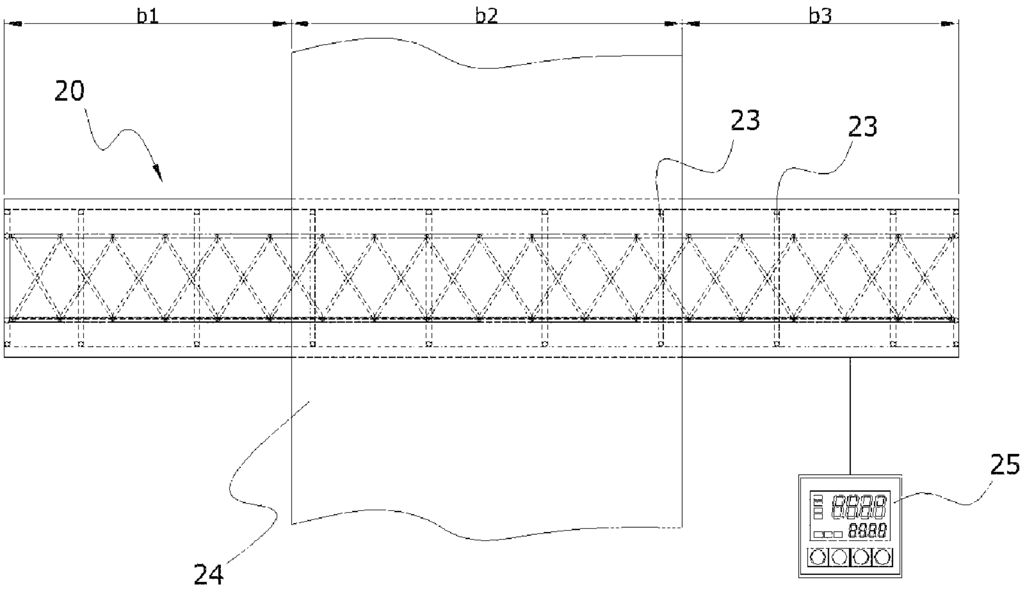
FIG. 7 is a schematic view showing the practical implementation of the present invention.

Referring to FIG. 6, when the surface temperature of the lengthwise drum 21 is risen up to a predetermined working temperature, the paper material 24 passing through the surface of the lengthwise drum 21 can absorb heat quickly so as to facilitate the subsequent forming and shaping operations.

Summing up above, this invention takes advantage of the ring type infrared lamps 23 to produce heat. As the ring type infrared lamps 23 have the features of light-weight and compactness, when they are integrally assembled with the lengthwise frame body 22 and are set in the rotatable lengthwise drum 21, the installation space of the heating facility can be reduced and thus the set-up cost of the overall apparatus can be saved. Not only the present invention can be used in rotatable drum without wiring restriction, but also maintenance can be carried out by only pulling the lengthwise frame body 22 out of the lengthwise drum 21. Therefore, maintenance time and space cost can be saved effectively. Since the infrared light emitted from the ring type infrared lamps 23 is served as the heat source for the lengthwise drum 21, no such pollution as waste-gas or the others is produced. Furthermore, there is no need for relevant pressure control; hence the safety in operation can be significantly increased.

The lengthwise drum 21 is hollow in its interior and the profile of its section can be designed as, for example, circular, semi-circular, and its outer surface can be designed as a curved or waved surface shape. The lengthwise frame body 22, formed by a plurality of rigid skeletons 221, is assembled within the lengthwise drum 21. The ring type infrared lamps 23 are arranged and disposed along the outer edge of the lengthwise frame body 22, and the ring type infrared lamps 23 are accommodated within the lengthwise drum 21, with positions located between the lengthwise drum 21 and the lengthwise frame body 22. The ring type infrared lamps 23 are mutually spaced at a predetermined interval. After activation, each of the ring type infrared lamps 23 can reach high temperature promptly and both the light and the heat energy thus produced can be transferred quickly in radiation manner to the surface of the lengthwise drum 21 so as to reach working temperature promptly.

Furthermore, the ring type infrared lamps 23 in the ring type infrared heating device 20 as shown in the figure can be arranged in such a manner that the lengthwise drum 21 has multi-segment heating zones (b1, b2, b3) on its surface. The width of the paper material 24 as shown in the figure is approximately equal to the width of the heating zone b2. Operator can activate each of the ring type infrared lamps 23 assembled in the heating zone b2 through external control device (such as power source controller, temperature controller) so that the heating zone b2 can be heated up. In this manner, operator can activate desired ring type infrared lamps 23 in the heating zones (b1, b2, b3) according to the width of the paper material used. For example, if the paper width covers the heating zones (b1, b2, b3), then all the heating zones (b1, b2, b3) are activated. On the other hand, if the paper width covers only a part of the heating zones (b1, b2, b3), then only part of the heating zones (b1, b2, b3) is activated so as to achieve energy saving.

Figure 8:
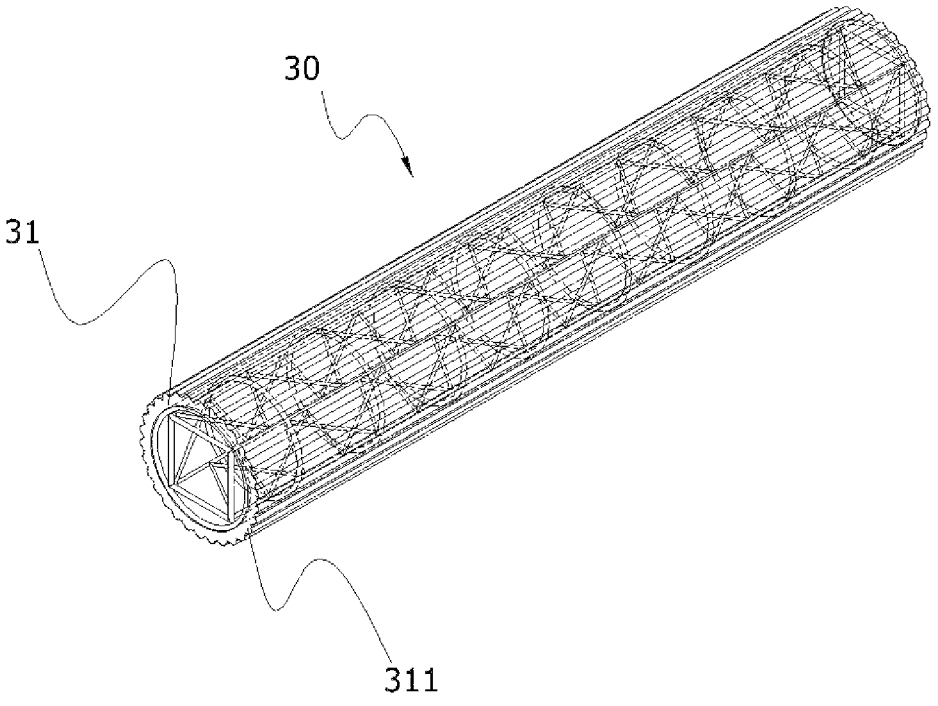
FIG. 8 is another embodiment of the present invention.
Figure 9:
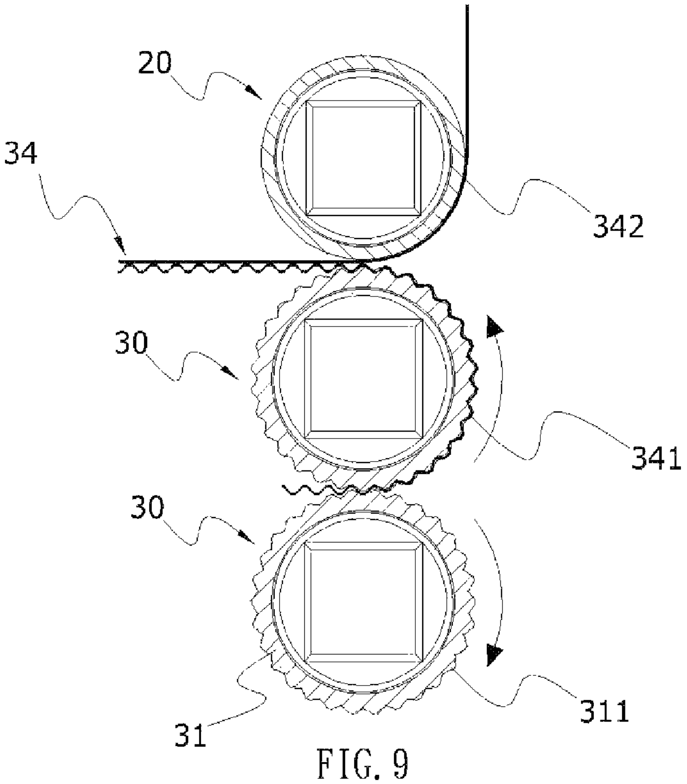
FIG. 9 is a schematic view showing the actuation of another embodiment of the present invention.

Referring to FIG. 8, the lengthwise drum 31 of the ring type infrared heating device 30 of the present invention can be shaped in such a manner that a plurality of corrugated teeth 311 are extended to define a corrugated outer surface of the lengthwise drum 31. The corrugated teeth 311 can be made into various shape according to demand, such as the corrugated shape in this figure. Referring to FIG. 9, two ring type infrared heating devices 30 with corrugated outer surfaces are assembled integrally with one ring type infrared heating device 20. In this manner, an operator can feed a first paper material 341 in between the two ring type infrared heating devices 30 rotated in opposite directions, so that the first paper material 341 is heated and pressed by the corrugated surfaces of the two ring type infrared heating devices 30 so as to shape the first paper material 341 into a corrugated pattern. Next, the protruding face of the first paper material 341 is injected with adhesive, and then the first paper material 341 with corrugated shape and a second paper material 342 are fed simultaneously in between the ring type infrared heating device 30 and the ring type infrared heating devices 20 mutually rotated in opposite direction, so that the first paper material 341 and the second paper material 342 are heated and glued together to form a corrugated cardboard 34 with higher physical strength.

Figure 5:
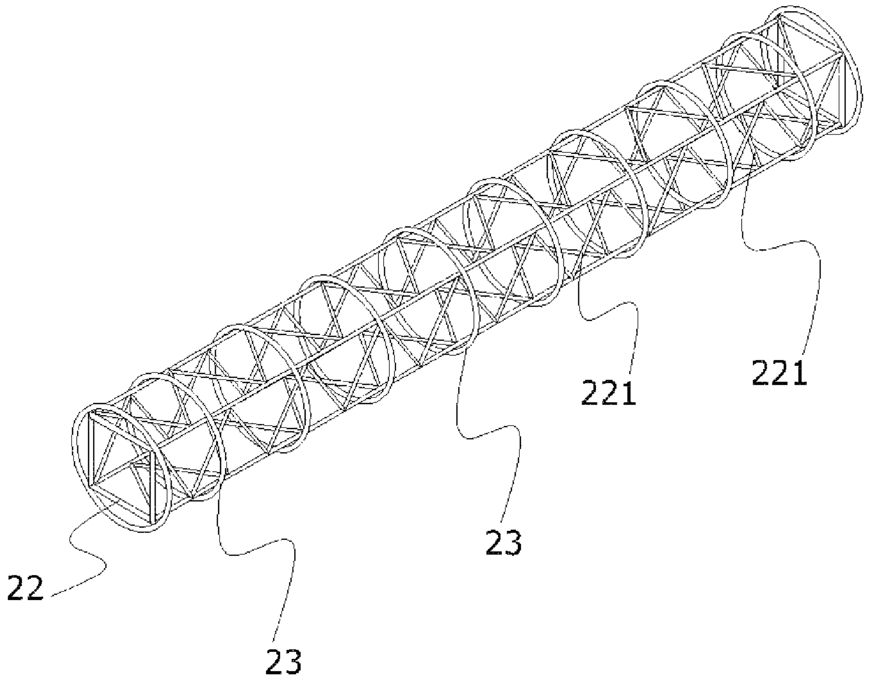
FIG. 5 is a schematic view showing internal parts of the present invention.
Figure 10:
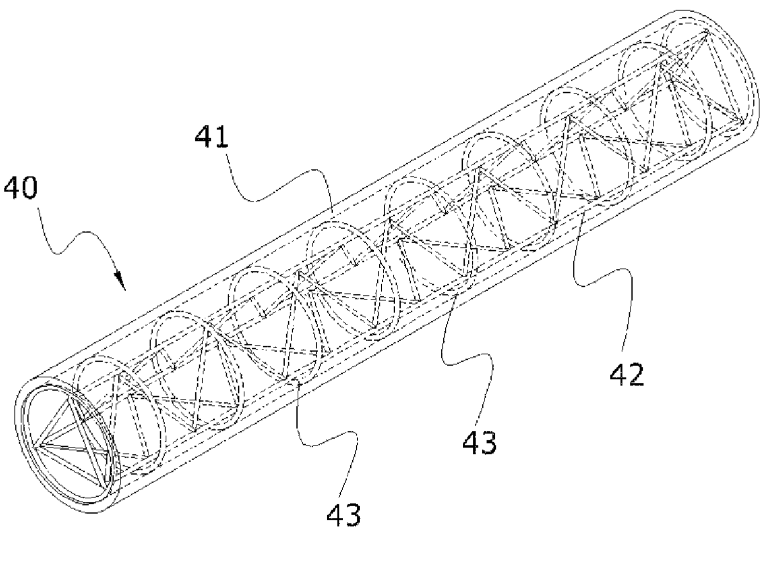
FIG. 10 is yet another embodiment of the present invention.

Referring to FIG. 10, the outer edge of the lengthwise frame body 42 of the ring type infrared heating device 40 of the present invention can be shaped in such a manner to form various shape according to practical demand, such as triangular shape as shown in this figure, or rectangular shape as shown in FIGS. 5, 6 and 8, and a plurality of ring type infrared lamps 43 are provided at its outer edge. As the present invention takes advantage of ring type infrared lamps 43 as the heat source, the tube thickness of the lengthwise drum 41 is kept only at a minimum thickness. The shapes of the lengthwise drum 41 and the lengthwise frame body 42 can be designed according to user's need so that the present invention has the advantage of wide applicability.

Based on foregoing, since the present invention uses ring type infrared lamps as the heat source, energy and installing space can be saved, pollution is also eliminated in operation, and hence the safety in operation can be significantly increased. Therefore, the purpose of providing a ring type infrared heating device with compactness in volume, high safety in operation, energy-saving effect, low set-up cost and easy maintenance can be achieved by the implementation of the present invention.

While the present invention has been described by preferred embodiments in conjunction with accompanying drawings, it should be understood the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

What is claimed is:

1. A ring type infrared heating device, assembled in a corrugated cardboard manufacturing apparatus for heating up a paper raw material so as to facilitate subsequent forming and shaping operations, comprising:

a lengthwise drum with a hollow interior and an outer surface;

a lengthwise frame body formed by assembly of a plurality of rigid skeletons, said lengthwise frame body being assembled at the inside of said lengthwise drum and including an outer edge; and a plurality of ring type infrared lamps assembled at the outer edge of said lengthwise frame body, heat produced by the activation of said ring type infrared lamps being used to raise up the temperature on the surface of said lengthwise drum.

2. The ring type infrared heating device as claimed in claim 1, wherein said ring type infrared lamps are arranged to be mutually spaced at a predetermined interval and said ring type infrared lamps are located between said lengthwise drum and said lengthwise frame body.

3. The ring type infrared heating device as claimed in claim 1, wherein each of said ring type infrared lamps is electrically connected to a temperature controller.

4. The ring type infrared heating device as claimed in claim 1, wherein said ring type infrared lamps are arranged and disposed within said lengthwise drum in such a manner that a plurality of heating zones are formed on the surface of said lengthwise drum.

5. The ring type infrared heating device as claimed in claim 1, wherein the sectional profile of the outer surface of said lengthwise drum is circular in shape.

6. The ring type infrared heating device as claimed in claim 1, wherein the sectional profile of the outer surface of said lengthwise drum is a corrugated shape.

7. The ring type infrared heating device as claimed in claim 1, wherein the sectional profile of the outer edge of said lengthwise frame body is rectangular in shape.

8. The ring type infrared heating device as claimed in claim 1, wherein the sectional profile of the outer edge of said lengthwise frame body is triangular in shape.

* * * * *